(12) United States Patent
Jafarian et al.

(10) Patent No.: US 9,084,141 B2
(45) Date of Patent: Jul. 14, 2015

(54) SYSTEMS AND METHODS FOR GROUPING NODES TO REDUCE COLLISIONS

(71) Applicant: Qualcomm Incorporated, San Diego, CA (US)

(72) Inventors: Amin Jafarian, San Diego, CA (US); Simone Merlin, San Diego, CA (US); Santosh Paul Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 159 days.

(21) Appl. No.: 13/830,984

(22) Filed: Mar. 14, 2013

(65) Prior Publication Data

US 2014/0269631 A1    Sep. 18, 2014

(51) Int. Cl.
  *H04W 28/04*    (2009.01)
  *H04W 74/08*    (2009.01)

(52) U.S. Cl.
  CPC ........ *H04W 28/044* (2013.01); *H04W 74/0816* (2013.01); *H04W 74/0825* (2013.01); *H04W 74/0866* (2013.01)

(58) Field of Classification Search
  None
  See application file for complete search history.

(56) References Cited

U.S. PATENT DOCUMENTS

| 2006/0293048 | A1* | 12/2006 | Swanson et al. | ........... 455/426.1 |
| 2007/0058636 | A1* | 3/2007 | Cormier | ........................ 370/394 |
| 2007/0274272 | A1* | 11/2007 | Joshi et al. | ..................... 370/338 |
| 2011/0299399 | A1* | 12/2011 | Egan et al. | ..................... 370/237 |
| 2012/0026890 | A1 | 2/2012 | Banka et al. | |
| 2012/0243431 | A1 | 9/2012 | Chen et al. | |
| 2012/0320759 | A1* | 12/2012 | Shao et al. | ..................... 370/242 |

OTHER PUBLICATIONS

K. Whitehouse, A.Woo, F. Jiang, J. Polastre, and D. Culler. Exploiting the Capture Effect for Collision Detection and Recovery. In IEEE EmNetS-II, May 2005.*
Rayanchu, S., et al., "Diagnosing wireless packet losses in 802.11: Separating collision from weak signal", IEEE INFOCOM 2008 proceeedings.*
Hwang, L. et al. (Jul. 2005). Grouping strategy for solving hidden node problem in IEEE 802.15.4 LR-WPAN. First International Conference on Wireless Internet, Proceedings, 26-32: See highlighted portions.
Rhee, I. et al. (Oct. 2009). DRAND: Distributed randomized TDMA scheduling for wireless ad-hoc networks. IEEE Transactions on Mobile Computing—TMC, vol. 8, No. 10, 1384-1396: See highlighted portions.
Li, J. et al. (Nov. 2007). Time slot assignment for maximum bandwidth in a mobile ad hoc network. Journal of Communications, vol. 2, No. 6, 56-64: See highlighted portions.

* cited by examiner

*Primary Examiner* — Faruk Hamza
*Assistant Examiner* — Cassandra Decker
(74) *Attorney, Agent, or Firm* — Knobbe Martens Olson & Bear LLP

(57) ABSTRACT

Systems, methods, and devices for grouping nodes to reduce collisions are described herein. In one aspect, a method for reducing collisions in a wireless communication network is provided. The method includes receiving a packet from a first wireless device, the packet including an indication of a packet loss observed by the first wireless device. The method then determines that a collision occurred based on the indication of a packet loss. The method then assigns at least one wireless device to at least one group, based at least in part on the detected collision.

36 Claims, 5 Drawing Sheets

SYSTEMS AND METHODS FOR GROUPING NODES TO REDUCE COLLISIONS

BACKGROUND

1. Field

The present application relates generally to wireless communications, and more specifically to systems, methods, and devices for grouping nodes to reduce collisions.

2. Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g. Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Devices in a network, such as stations (STAs), may be able to transmit to an access point (AP), but may be unable to receive transmissions from other STAs, due to low-power sensors and due to distance. Thus, two STAs may be unaware of each other, and thus, their transmissions may collide with one another. Accordingly, it is desirable to provide a way to group STAs based upon their location, in order to avoid hidden node problems and to reduce collisions.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include decreasing the overhead in transmitting payloads in data packets.

One aspect of the disclosure provides a method for reducing collisions in a wireless communication network. The method comprises receiving a packet from a first wireless device, the packet including an indication of a packet loss observed by the first wireless device; determining, based on the indication of packet loss, that a collision occurred; and assigning at least one wireless device to at least one group, based at least in part on the detected collision.

In another aspect, a device is disclosed, the device comprising: a memory; and a processor configured to: receive a packet from a first wireless device, the packet including an indication of a packet loss observed by the first wireless device; determine, based on the indication of packet loss, that a collision occurred; and assign at least one wireless device to at least one group, based at least in part on the detected collision.

In yet another aspect, a non-transitory, computer readable medium comprising instructions that when executed cause a processor in a device to perform a method for reducing collisions in a wireless network is disclosed. The method comprises receiving a packet from a first wireless device, the packet including an indication of a packet loss observed by the first wireless device; determining, based on the indication of packet loss, that a collision occurred; and assigning at least one wireless device to at least one group, based at least in part on the detected collision.

In a further aspect, a device is disclosed, the device comprising means for receiving a packet from a first wireless device, the packet including an indication of a packet loss observed by the first wireless device; means for determining, based on the indication of packet loss, that a collision occurred; and means for assigning at least one wireless device to at least one group, based at least in part on the detected collision.

DETAILED DESCRIPTION

Figure 1:
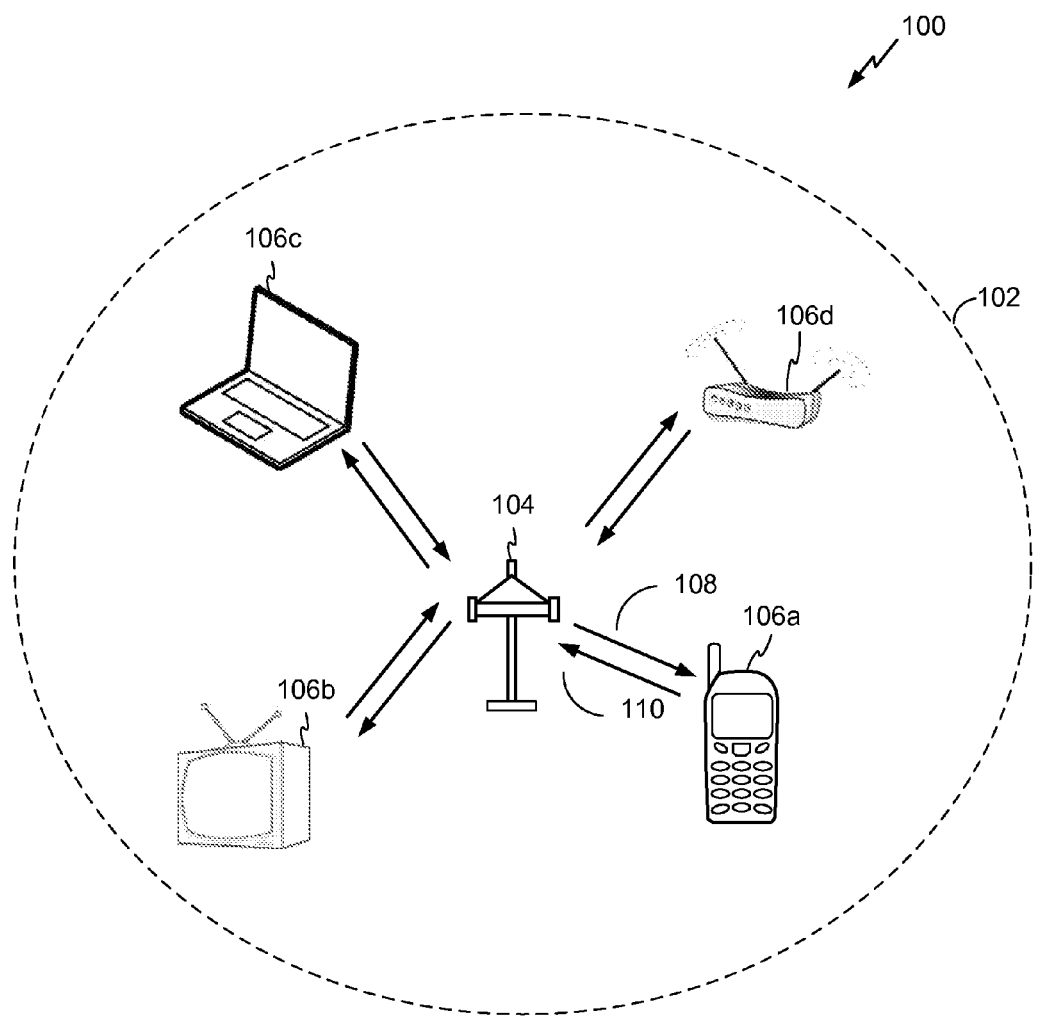
FIG. 1 illustrates an example of a wireless communication system in which aspects of the present disclosure may be employed.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of the IEEE 802.11ah protocol, which uses sub-1 GHz bands.

In some aspects, wireless signals in a sub-gigahertz band may be transmitted according to the 802.11ah protocol using orthogonal frequency-division multiplexing (OFDM), direct-sequence spread spectrum (DSSS) communications, a combination of OFDM and DSSS communications, or other schemes Implementations of the 802.11ah protocol may be used for sensors, metering, and smart grid networks. Advantageously, aspects of certain devices implementing the 802.11ah protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP serves as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol such as 802.11ah) compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement the 802.11ah standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 illustrates an example of a wireless communication system 100 in which aspects of the present disclosure may be employed. The wireless communication system 100 may operate pursuant to a wireless standard, for example the 802.11ah standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 2:
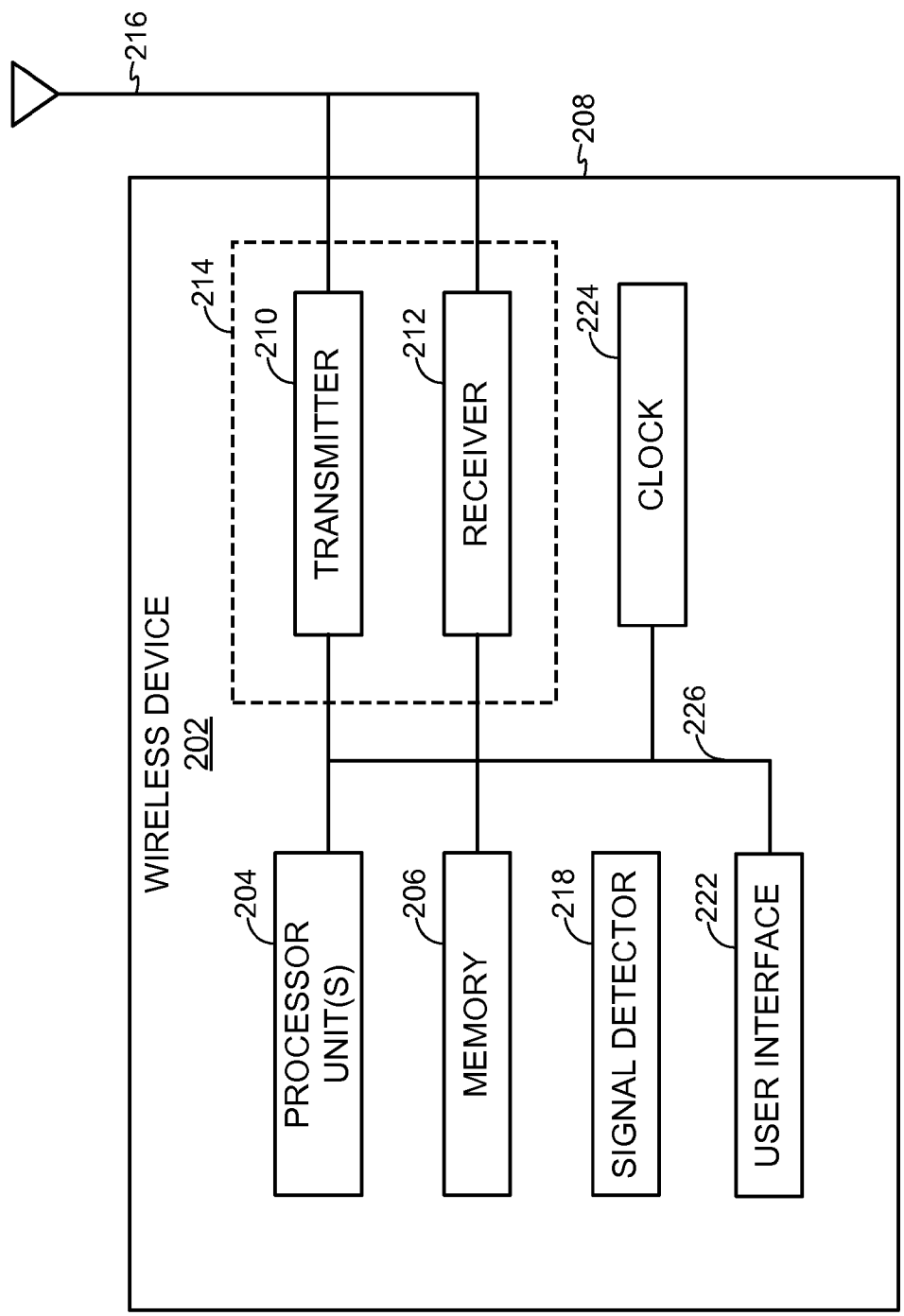
FIG. 2 shows a functional block diagram of an exemplary wireless device that may be employed within the wireless communication system of FIG. 1.

FIG. 2 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

As discussed above, the wireless device 202 may comprise an AP 104 or an STA 106, and may be used to transmit and/or receive communications. In some aspects, a wireless network may wish to avoid the hidden node problem. This can occur when two or more STAs, such as STA 106, are connected to the same AP, such as AP 104 and both can communicate with the AP, but cannot communicate with each other. For example, this may occur if two STAs are on the opposite sides of the AP, and are both some distance from the AP, such that the distance between the STAs may be up to twice as far as the distance to the AP. The STAs may not be able to receive transmissions from each other due to distance and due to low-power sensors. Thus, two STAs may be unaware of each other. Because of this, the STAs may transmit messages at the same time as each other, and these transmissions may thus collide with each other. Thus, it may be beneficial to group STAs, such as based upon their location, in order to avoid hidden nodes and to minimize collisions. Such a grouping may place STAs that can receive each other's transmissions into the same group, such that each group member may be able to receive transmissions from each other group member. This may reduce the number of collisions that occur between group members, as hidden nodes may be minimized.

Figure 3:
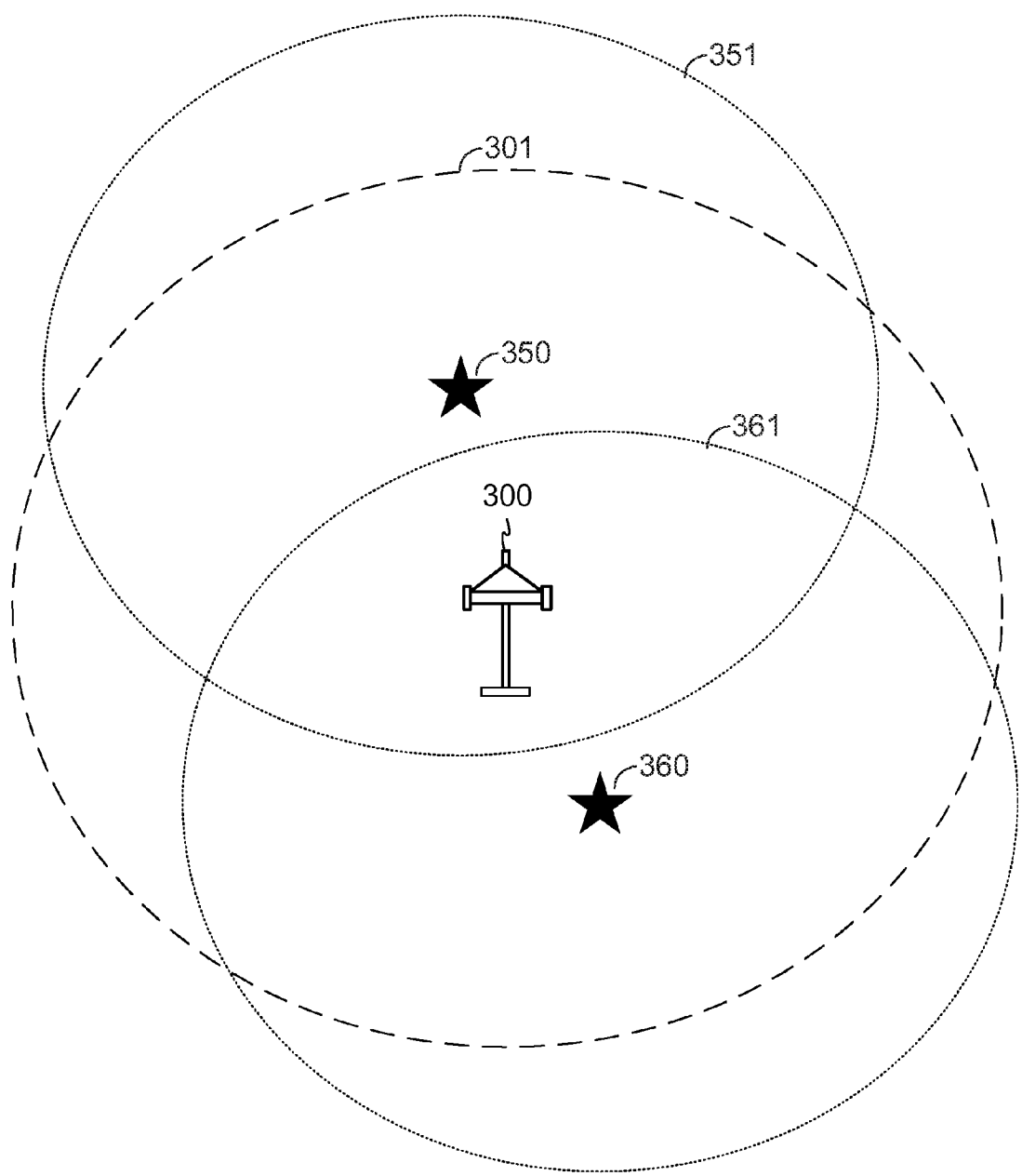
FIG. 3 illustrates a method by which wireless devices may alert an AP of lost packets, so that the AP may identify collisions.

FIG. 3 is an illustration of nodes which may be hidden from each other. An AP 300 may be the center of a network. The AP 300 may have a communication range 301, represented by a dashed line centered on AP 300. Within communication range 301, devices may be able to receive communications from AP 300. Any number of STAs may be associated with AP 300. For example, these STAs may be a part of a network that is offered by AP 300. In FIG. 3, two STAs 350, 360, or nodes, are shown. Each STA may have a communication range, inside which its communications may be received by another device. For example, STA 350 may have a communication range 351, illustrated by a dotted line. STA 360 may similarly have a communication range 361. In some aspects, the communication range of a STA may be larger or smaller than that of the AP 300, or may be the same size. In some aspects, the distance a STA may communicate may vary between STAs, and may depend, at least in part, on the device receiving communications from the STA, and the power of its receiver.

In order for a STA to receive communications from AP 300, it must be within communication range 301. In order for AP 300 to receive communications from a STA, the AP 300 must be within a communication range associated with that STA. For example, AP 300 is within both communication range 351 and communication range 361. Therefore, AP 300 is capable of receiving communications from both STA 350 and STA 360. However, two STAs which are capable of communicating with AP 300 may not be capable of communicating with each other. For example, STA 350 cannot receive communication from STA 360, as STA 350 is not within communication range 361. Similarly, STA 360 cannot receive communication from STA 350, as STA 360 is not within communication range 351. Therefore, STA 350 and STA 360 may be hidden nodes with respect to each other. Hidden nodes may be problematic within a network, as STA 350 and 360 may, for example, send packets at overlapping times to AP 300, and thus, one or both of these packets may be lost. STAs 350 and 360 may be more likely to send transmissions that may collide with each other, as they are unable to receive transmissions from each other, and therefore unable to coordinate transmission times with each other, or avoid beginning a transmission when the other node is transmitting. Low-power transmitters and distance, among other factors, may lead to hidden nodes. For example, many wireless devices may have transmission power of 0 dbm or less. These transmitters may have limited range, and thus, some other nodes may be unable to receive transmissions from these low-power transmitters. Collisions may be even more likely in crowded networks with many nodes. For example, and 802.11ah network allows up to 6000 stations, which may lead to many collisions. Further, if two nodes cannot detect each other, if the two nodes are static, they may continue to collide with each other without a method to avoid such collisions.

Figure 4:
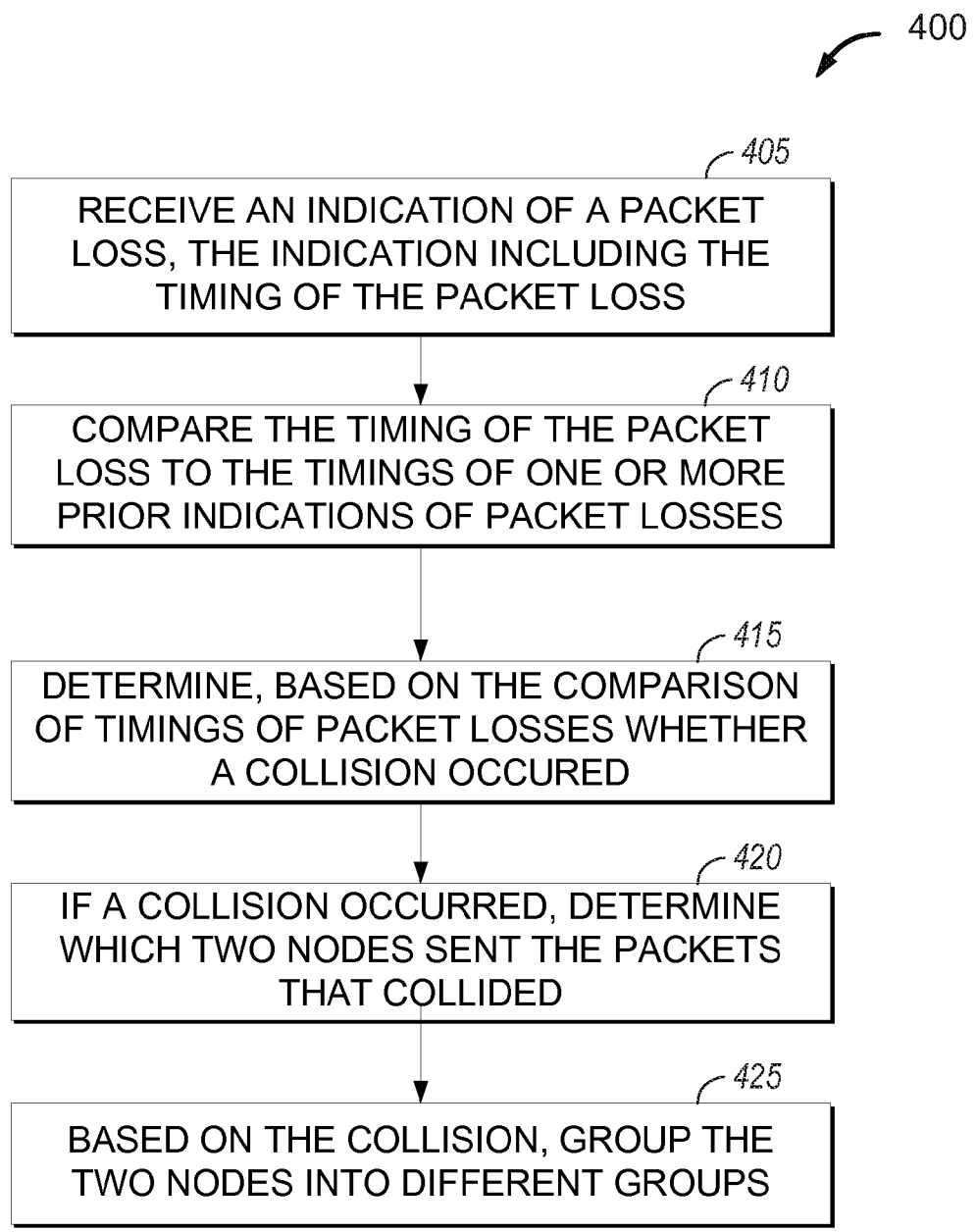
FIG. 4 illustrates a method by which a wireless device may group nodes in order to reduce collisions.

FIG. 4 illustrates a method by which a wireless device may group nodes in order to reduce collisions. This method may be carried out by an AP, such as AP 104, which is in communication with one or more STAs, such as STA 106.

At block 405, the AP 104 receives an indication of a packet loss, the indication including a timing of the packet loss. For example, the indication may include a time stamp of a previously-sent packet that was lost. This indication may be contained within a packet sent by a STA 106. This indication may describe a packet previously-sent by STA 106 that was lost, or may describe a packet sent by another wireless device, such as another STA, that was lost. In some aspects, this indication may include information regarding which wireless device sent the packet that was lost. In some aspects, a single packet may include more than one indication of packet losses. For example, a single packet may include an indication of each packet lost since the last successfully-received packet.

At block 410, the AP 104 compares the timing of the packet loss to the timings of one or more prior indications of packet losses. For example, the AP 104 may record each packet loss into a memory such as a database, for some duration of time. The AP 104 may compare the timing of a new packet loss to previous indications of packet losses. The AP 104 may also compare other aspects of received indications of packet losses. For example, the AP 104 may also compare which STA sent the packet, and compare the sending STA of the lost packet to the sending STA of other lost packets in the database.

At block 405, the AP 104 receives an indication of a packet loss, the indication including a timing of the packet loss. For example, the indication may include a time stamp of a previously-sent packet that was lost. This indication may be contained within a packet sent by a STA 106. This indication may describe a packet previously-sent by STA 106 that was lost, or may describe a packet sent by another wireless device, such as another STA, that was lost. In some aspects, this indication may include information regarding which wireless device sent the packet that was lost. In some aspects, a single packet may include more than one indication of packet losses. For example, a single packet may include an indication of each packet lost since the last successfully-received packet.

At block 420, the AP 104 determines which two or more nodes sent the packets that collided if a collision occurred. For example, the AP 104 may determine which two nodes or STAs sent notifications that they lost a packet at an overlapping time with each other. In some aspects, the AP 104 may determine the sender of two or more packets prior to determining whether a collision occurred. For example, if nodes transmit information on observed packet loss of other devices, an AP 104 may receive multiple notifications of the same lost packet. In order to determine whether a collision occurred, the AP 104 may need to determine which nodes sent each lost packet, in order to determine whether a new indication of a packet loss is the result of a collision or if the AP 104 is merely receiving a duplicate notification of a collision.

At block 425, the AP 104 groups the two or more nodes into different groups based on the collision. For example, if the AP 104 finds that packets from two nodes or STAs collided with each other, the AP 104 may determine that the two nodes are hidden from each other. In some aspects, it may be beneficial to group nodes into separate groups when the nodes may collide with each other and may not be able to receive communications from each other. In some aspects, different groups formed by the AP 104 may be associated with different timing windows. In some aspects, these timing windows may not overlap. In some aspects, nodes in each group may be aware of the timing window associated with that group, and may send transmissions only during that timing window. In some aspects, groups may be formed based on geographic location of nodes within a group. In some aspects, it may be desirable to form groups with the intention of minimizing the number of nodes within a certain group that are hidden with respect to any other node in the group. These groups may be formed over time, based upon collisions that the AP 104 may learn of based, at least in part, on indications of packets lost.

In some aspects, STAs may be configured to send information on lost packets that each STA observes, including packets sent by other STAs. For example, each STA that observes a packet that is lost may send information regarding the lost packet. For example, a STA may transmit information to the AP 104 regarding a lost packet sent by another STA, including timing information of the packet, and information on which STA sent the packet. In some aspects, the AP 104 may be configured to use this information from the STAs when assigning STAs to groups. In some aspects, a single STA may be assigned to one or more groups. In some aspects, each STA may be assigned to at least one group. In some aspects, a new STA joining a network may be assigned to a group, such as a default group or a group with the fewest members.

In some aspects, the AP 104 may be further configured to transmit information to a STA, based upon the group or groups a STA is placed in. For example, the AP 104 may transmit to the STA information regarding timing windows for sending messages to the AP 104. These timing windows may be based, at least in part, on a group that a STA is assigned to by the AP 104. In some aspects, the AP 104 may provide a STA with one or more groups for upload timing and with one or more groups for download timing. In some aspects, a group may be associated with both a timing for uploads and a timing for downloads. In some aspects, the AP 104 may use Restricted Access Windows, as defined in the IEEE 802.11ah standard, to define intervals of times during which certain groups may or may not access the AP 104.

In some aspects, the AP 104 may use a graph or other data structure to store the relationships between nodes in the network. For example, the AP 104 may use a data structure to store which nodes are unable to see other nodes, based upon collision information. As more collisions are detected, this data structure may be added to and/or revised as needed. This graph or data structure may be used, at least in part, to determine how many groups are needed, and which nodes should go into which group. In some aspects, grouping nodes may be more successful in networks where nodes are stationary or moving slowly. In networks where nodes move quickly, such information may be less useful, as which nodes are hidden relative to each other may change quickly.

Figure 5:
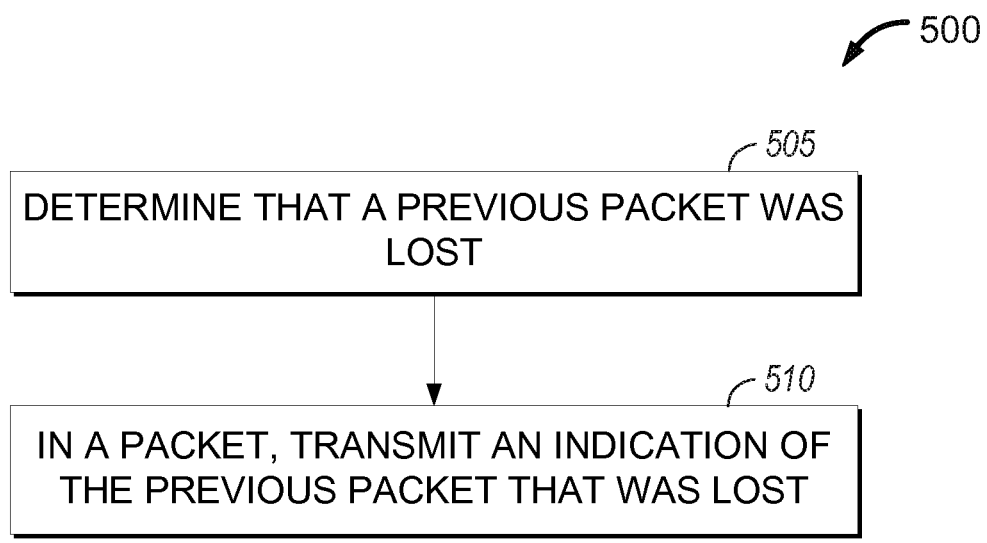
FIG. 5 illustrates a method 500 that a wireless device may use to transmit packet loss information.

FIG. 5 illustrates a method 500 that a wireless device may use to transmit packet loss information. This method may be done by a STA such as STA 106, which may be in communication with an AP, such as AP 104. This method may be used, for example, on an IEEE 802.11ah network.

At block 505, the STA 106 determines that a previous packet was lost. In some aspects, the previous packet may have been sent by STA 106. For example, the STA 106 may determine that a previous packet that it sent to the AP 104 was lost. In some aspects, the previous packet may have been sent by AP 104 or by another STA. A number of factors may cause a lost packet. For example, a packet sent by the STA 106 may be lost due to changing distances between the STA 106 and the AP 104, interference from another packet sent by another device or natural interference, or other causes. For example, a packet may be lost if the packet is sent at the same time as another device sends a packet. These two packets may collide, or interfere with each other, such that one or both packets may be lost.

At block 510, the STA 106 transmits in a packet an indication of the previous packet that was lost. The STA 106 may transmit enough information for another device to identify the lost packet in some way. For example, the STA 106 may transmit information regarding the timing of when the lost packet was sent. In some aspects, transmitting information regarding the timing of the lost packet may include information regarding both when the packet was sent, and also how large the packet was. In some aspects, the STA 106 may also transmit information regarding which device sent the packet, and which device was the intended recipient of the packet. In some aspects, the STA 106 may transmit information regarding one or more lost packets in a single packet. For example, if the STA 106 has had two or more packets lost since the last successfully transmitted packet, the STA 106 may include information about each of these two or more packets in a single packet. In some aspects, the STA 106 may transmit information of lost packets in the form of a time stamp, indicating a time at which the STA 106 sent a packet that was lost. In some aspects, the STA 106 may be configured to not send the duration of each transmission, and an AP 104 may be configured to implicitly determine the duration of a transmission by sensing the medium energy or by the MCSs that the STA 106 had been using prior to the current successful transmission. In some aspects, the STA 106 may explicitly send the duration of a transmission. For example, the STA 106 may transmit a time stamp of the lost packet and an indication of the duration of the lost packet.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for reducing collisions in a wireless communication network, the method comprising:
   receiving, by an access point, a packet from a first wireless device, the packet comprising an indication of a packet loss observed by the first wireless device, and the indication of the packet loss comprising timing information of the lost packet;
   comparing, by the access point, the indication of the packet loss with information contained in a database, the information contained in the database comprising information from previously received indications of packet losses, comprising respective timing information of lost packets, sent by at least one other wireless device;
   determining, by the access point, that a collision occurred, the determining based on the indication of the packet loss and a comparison of the timing information of the lost packet with the respective timing information of the lost packets from the previously received indications of packet losses; and
   assigning, by the access point, at least one wireless device to at least one group, based at least in part on the detected collision.

2. The method of claim 1, wherein assigning at least one wireless device to at least one group comprises:
   determining that the first wireless device and a second wireless device are unable to receive communication with each other, based at least in part on the detected collision;
   assigning the first wireless device to a first group; and
   assigning the second wireless device to a second group.

3. The method of claim 1, further comprising:
   associating a timing window with the at least one group, during which wireless devices within the at least one group may transmit information on the wireless communication network.

4. The method of claim 3, wherein associating the timing window comprises using a restricted access window to associate the timing window with the at least one group.

5. The method of claim 1, wherein the packet further comprises an indication of another packet loss observed by the first wireless device.

6. The method of claim 1, wherein the indication of the packet loss comprises an indication of a packet previously sent by the first wireless device which was lost.

7. The method of claim 1, wherein the timing information of the lost packet comprises a time stamp and a duration of the lost packet.

8. The method of claim 1, wherein the indication of the packet loss comprises an indication of a wireless device that sent the lost packet.

9. The method of claim 1, wherein the timing information of the lost packet comprises an indication of when the lost packet was sent and an indication of the duration of the lost packet.

10. A device operable in a wireless communication network, the device comprising:
    a memory; and
    a processor configured to:
       receive a packet from a first wireless device, the packet comprising an indication of a packet loss observed by the first wireless device, and the indication of the packet loss comprising timing information of the lost packet;
       compare the indication of the packet loss with information contained in a database, the information contained in the database comprising information from previously received indications of packet losses, comprising respective timing information of lost packets, sent by at least one other wireless device;
       determine that a collision occurred based on the indication of the packet loss and a comparison of the timing information of the lost packet with the respective timing information of the lost packets from the previously received indications of packet losses; and
       assign at least one wireless device to at least one group, based at least in part on the detected collision.

11. The device of claim 10, wherein the processor is further configured to:
    determine that the first wireless device and a second wireless device are unable to receive communication with each other, based at least in part on the detected collision;
    assign the first wireless device to a first group; and
    assign the second wireless device to a second group.

12. The device of claim 10, wherein the processor is further configured to:
    associate a timing window with the at least one group, during which wireless devices within the at least one group may transmit information on the wireless communication network.

13. The device of claim 12, wherein associating the timing window comprises using a restricted access window to associate the timing window with the at least one group.

14. The device of claim 10, wherein the packet further comprises an indication of another packet loss observed by the first wireless device.

15. The device of claim 10, wherein the indication of the packet loss comprises an indication of a packet previously sent by the first wireless device which was lost.

16. The device of claim 10, wherein the timing information of the packet loss comprises a time stamp and a duration of the lost packet.

17. The device of claim 10, wherein the indication of the packet loss comprises an indication of a wireless device that sent the lost packet.

18. The device of claim 10, wherein the timing information of the lost packet comprises an indication of when the lost packet was sent and an indication of the duration of the lost packet.

19. A non-transitory, computer readable medium comprising instructions that when executed cause a processor in a device to perform a method for reducing collisions in a wireless communication network, the method comprising:
   receiving a packet from a first wireless device, the packet comprising an indication of a packet loss observed by the first wireless device, and the indication of the packet loss comprising timing information of a lost packet;
   comparing the indication of the packet loss with information contained in a database, the information contained in the database comprising information from previously received indications of packet losses, comprising respective timing information of lost packets, sent by at least one other wireless device;
   determining that a collision occurred, the determining based on the indication of the packet loss and a comparison of the timing information of the lost packet with the respective timing information of the lost packets from the previously received indications of packet losses; and
   assigning at least one wireless device to at least one group, based at least in part on the detected collision.

20. The non-transitory, computer readable medium of claim 19, wherein assigning at least one wireless device to at least one group comprises:
   determining that the first wireless device and a second wireless device are unable to receive communication with each other, based at least in part on the detected collision;
   assigning the first wireless device to a first group; and
   assigning the second wireless device to a second group.

21. The non-transitory, computer readable medium of claim 19, the method further comprising:
   associating a timing window with the at least one group, during which wireless devices within the at least one group may transmit information on the wireless communication network.

22. The non-transitory, computer readable medium of claim 21, wherein associating the timing window comprises using a restricted access window to associate the timing window with the at least one group.

23. The non-transitory, computer readable medium of claim 19, wherein the packet further comprises an indication of another packet loss observed by the first wireless device.

24. The non-transitory, computer readable medium of claim 19, wherein the indication of the packet loss comprises an indication of a packet previously sent by the first wireless device which was lost.

25. The non-transitory, computer readable medium of claim 19, wherein the timing information of the lost packet comprises a time stamp and a duration of the lost packet.

26. The non-transitory, computer readable medium of claim 19, wherein the indication of the packet loss comprises an indication of a wireless device that sent the lost packet.

27. The non-transitory, computer readable medium of claim 19, wherein the timing information of the lost packet comprises an indication of when the lost packet was sent and an indication of the duration of the lost packet.

28. A device operable in a wireless communication network, the device comprising:
   means for receiving a packet from a first wireless device, the packet comprising an indication of a packet loss observed by the first wireless device, and the indication of the packet loss comprising timing information of a lost packet;
   means for comparing the indication of the packet loss with information contained in a database, the information contained in the database comprising information from previously received indications of packet losses, comprising respective timing information of lost packets, sent by at least one other wireless device;
   means for determining that a collision occurred based on the indication of the packet loss and a comparison of the timing information of the lost packet with the respective timing information of the lost packets from the previously received indications of packet losses; and
   means for assigning at least one wireless device to at least one group, based at least in part on the detected collision.

29. The device of claim 28, wherein the assigning means is configured to:
   determine that the first wireless device and a second wireless device are unable to receive communication with each other, based at least in part on the detected collision;
   assign the first wireless device to a first group; and
   assign the second wireless device to a second group.

30. The device of claim 28, further comprising:
   means for associating a timing window with the at least one group, during which wireless devices within the at least one group may transmit information on the wireless communication network.

31. The device of claim 30, wherein the associating means is configured to use a restricted access window to associate the timing window with the at least one group.

32. The device of claim 28, wherein the packet further comprises an indication of another packet loss observed by the first wireless device.

33. The device of claim 28, wherein the indication of the packet loss comprises an indication of a packet previously sent by the first wireless device which was lost.

34. The device of claim 28, wherein the timing information of the lost packet comprises a time stamp and a duration of the lost packet.

35. The device of claim 28, wherein the indication of the packet loss comprises an indication of a wireless device that sent the lost packet.

36. The device of claim 28, wherein the timing information of the lost packet comprises an indication of when the lost packet was sent and an indication of the duration of the lost packet.

* * * * *

UNITED STATES PATENT AND TRADEMARK OFFICE
CERTIFICATE OF CORRECTION

| | | Page 1 of 1 |
|---|---|---|
| PATENT NO. | : 9,084,141 B2 | |
| APPLICATION NO. | : 13/830984 | |
| DATED | : July 14, 2015 | |
| INVENTOR(S) | : Amin Jafarian et al. | |

It is certified that error appears in the above-identified patent and that said Letters Patent is hereby corrected as shown below:

IN THE SPECIFICATION

In column 7 at lines 31-43, Change "At block 405, AP 104 receives an indication of a packet loss, the indication including a timing of the packet loss. For example, the indication may include a time stamp of a previously-sent packet that was lost. This indication may be contained within a packet sent by a STA 106. This indication may describe a packet previously-sent by STA 106 that was lost, or may describe a packet sent by another wireless device, such as another STA, that was lost. In some aspects, this indication may include information regarding which wireless device sent the packet that was lost. In some aspects, a single packet may include more than one indication of packet losses. For example, a single packet may include an indication of each packet lost since the last successfully-received packet." to --At block 415, the AP 104 determines whether a collision occurred based at least on the comparison of timings of packet losses. For example, the AP 104 may determine that two or more packets were sent to the AP 104 at overlapping times, and that one or both of these packets were lost. The AP 104 may, therefore, conclude that a collision occurred between at least those two or more packets.--.

Signed and Sealed this
Sixteenth Day of February, 2016

Michelle K. Lee
*Director of the United States Patent and Trademark Office*